United States Patent [19]

Lucich et al.

[11] Patent Number: 5,167,320

[45] Date of Patent: Dec. 1, 1992

[54] VARIABLE SPEED DRIVE FOR SCREW CONVEYOR

[75] Inventors: Todd C. Lucich, Simpsonville, S.C.; Edward F. Krome, Jr., Columbus, Ind.; Michael G. Howe, Columbus, Ind.; Larry D. Fields, Columbus, Ind.

[73] Assignee: Reliance Electric Industrial Company, Greenville, S.C.

[21] Appl. No.: 664,588

[22] Filed: Mar. 4, 1991

[51] Int. Cl.$^5$ .............................. B65G 33/34
[52] U.S. Cl. ...................................... 198/675
[58] Field of Search ........................ 198/675

[56] References Cited

U.S. PATENT DOCUMENTS

| | | | |
|---|---|---|---|
| 3,398,597 | 8/1968 | Chung | 74/421 |
| 3,590,652 | 7/1971 | Strang | 74/421 |
| 3,817,665 | 6/1974 | Myers | 418/189 |
| 3,942,414 | 3/1976 | Eddy | 91/487 |
| 4,370,139 | 1/1983 | Zigler | 474/45 |
| 4,384,863 | 5/1983 | Huff et al. | 474/28 |
| 4,411,590 | 10/1983 | Meredith | 415/26 |
| 4,425,102 | 1/1984 | Huff et al. | 474/28 |
| 4,730,951 | 3/1988 | Barnsfather | 403/24 |
| 4,770,065 | 9/1988 | Woyton | 474/18 |
| 4,973,172 | 11/1990 | Nisley et al. | 384/492 |

OTHER PUBLICATIONS

Brochure of Reliance Electric Industrial Company of Greenville, S.C., entitled "TA10 Dodge Torque-Arm Twin Tapered Bushing Speed Reducer", cover sheet, index page, and pp. 27 through 34.
Two brochures of Reliance Electric Industrial Company of Greenville, S.C., entited "SCXT Screw Conveyor Drives".
Catalog of Reliance Electric Industrial Company of Greenville, S.C., entitled "Dodge Gear Engineering Catalog, vol. 2.1", cover sheet, general index, and introduction (5 pages), and pp. G5-through G5-7, G6-1 through G6-3, G7-1, G7-18, G7-19, M1-2, M1-3, M1-6, and M1-162.
Catalog of Sew-Eurodrive, Inc., of Lyman, S.C., entitled "Variable Speed Drives", cover sheet, pp. 3, 138, 155 through 157, 160, 161, 300, and 311 through 314.

*Primary Examiner*—Robert P. Olszewski
*Assistant Examiner*—Cheryl L. Gastineau
*Attorney, Agent, or Firm*—Dority & Manning

[57] ABSTRACT

A variable speed drive for a screw conveyor includes a mechanical adjustable variable speed belt drive and a torque-arm speed reducer. The belt drive is associated with the speed reducer through the combination of a mounting adapter and a mounting plate. A coupling shaft extends from the output discs of the belt drive through the mounting adapter and plate into driving relationship with the input of the speed reducer. The output shaft includes a mated splined output for receipt in a female splined input of the speed reducer. The speed reducer is outfitted with a CEMA standard flange for attachment to a screw conveyor with the screw conveyor drive shaft received in an output bore of the speed reducer. The mounting adapter and plate support the belt drive in a C-flow drive power configuration for minimizing space requirements, while avoiding damage to the screw conveyor mounting flange by controlling undesired bending forces thereat. The resulting variable speed drive for a screw conveyor is particularly useful in food industry applications where the ability to make fine adjustments of screw conveyor speeds is highly desirable.

28 Claims, 3 Drawing Sheets

VARIABLE SPEED DRIVE FOR SCREW CONVEYOR

BACKGROUND OF THE INVENTION

The present invention generally concerns a variable speed drive for use with a screw conveyor, and more particularly concerns a combination of a mechanical adjustable variable speed belt drive with a torque-arm speed reducer for powering at user-selected variable speeds the drive shaft of a screw conveyor which is associated with the output of the speed reducer.

One long-term problem in the art specifically dealing with screw conveyor drives is to provide a practical and efficient variable speed drive. Fixed speed drives for screw conveyors are well known and widely used. One example of such is the Dodge-brand screw conveyor drive, a product of Reliance Electric Industrial Company, of Greenville, S.C., the Assignee of the subject application. Such screw conveyor drive includes a torque-arm speed reducer having a CEMA standard screw conveyor flange output and an output bore for drivingly receiving the screw conveyor drive shaft therein. CEMA (Conveyor Equipment Manufacturers Association) is a national organization which sets standards for screw conveyor components. Drive power is obtained from a fixed speed electric motor which is coupled to the speed reducer input through a belt drive.

While such Dodge-brand screw conveyor drive is a highly practical and reliable drive system for fixed speed screw conveyor installations, variable speed drive is not provided. Frequently, a screw conveyor is being used to feed materials of some type at a selected rate into a process of some kind. For whatever reason, the screw conveyor user may desire to adjust the material feed rate which would be accomplished by making a speed change of the screw conveyor drive shaft. Such change may be intended on a more permanent basis (as in a change to the process) or it may constitute simply an adjustment (fine or gross) to feed factors in an ongoing process. One approach could be to attempt to replace the fixed speed electric motor of the screw conveyor drive just described with a variable speed electric motor.

In general, while it is known to provide an electric motor with an electronic control system which would permit user-selected variation of the output speed of the electric motor, there are a variety of drawbacks associated with such an approach to this particular problem of screw conveyor drives. For example, electronically variable motor control systems require relatively higher designed-in power as a safety margin to prevent overheating. Screw conveyor drives have relatively higher torque requirements, which is another design factor which would tend to drive upwardly the power rating of any minimally adequate electronic control system. With higher power requirements comes higher current handling; with higher current handling comes higher heat generation, which will again dictate an accommodation thereof through increased motor size or other specialized heat sink features.

Another relative disadvantage with electronic motor control systems is the resulting increased physical size of the electric motor (due to the above-described design constraints) relative the replaced fixed speed electric motor, which can be a problem in some mounting situations. Also, any additional size and bulk presents design problems in mounting and support so as to prevent damage to the screw conveyor or the like due to undesired forces.

As in any system design, increased sizes and higher system capacity ratings invariably result in higher costs, which is generally undesirable.

The speed range capabilities of an electronic motor control system is also a factor. For example, a ten-to-one speed range is much more readily accomplished through a mechanical adjustable variable speed drive than with an electronic control system. Another speed range-related factor is the fact that some electronic control systems have difficulty in achieving a stable, relatively low operating speed, whereas mechanical drives generally have no such difficulty. One low speed drive problem associated with electronic control systems is referred to as cogging, which can result in unsmooth operation of the overall drive or even worse problems (such as stalling, vibration fatigue failures, and the like). It is also relatively speaking generally more difficult to slave an electronic control system (as compared with a mechanical adjustable system) to various processes with which some systems may be used.

One prior art alternative to attempting to provide an adequate electronic motor control system in place of a fixed speed electric motor attached via a belt drive to a torque-arm speed reducer is to replace the electric motor entirely with a hydraulic device which is coupled through a mounting plate to a torque-arm speed reducer. One example of such a device is the Dodge HYDROIL-brand drive, another product of the present Assignee, which can be coupled through a hydraulic motor adapter or coupling plate to the input of a torque-arm speed reducer, the output of which may be outfitted with a CEMA standard screw conveyor flange mount.

In general, a hydraulic drive is capable of infinitely adjustable speed and torque. It also generally has superior range, low speed torque capabilities, and low speed operation to that of a comparably rated electric motor with an electronic variable speed control system. Some examples of hydraulic devices are disclosed in Eddy (U.S. Pat. No. 3,942,414) and Myers (U.S. Pat. No. 3,817,665), both of which are commonly assigned to the present Assignee. While itself having advantageous characteristics and excellent performance for certain tasks, as is well known, a hydraulic drive requires a flow of hydraulic fluid for operation. Hence, in order to power the hydraulic drive, a suitable hydraulic pumping system must be provided. In addition, the hydraulic pumping system must be adequately rated to match the required performance standards for the hydraulic device. In other words, the hydraulic pumping system must be capable of providing an adequate hydraulic output to power the hydraulic device over its desired range. Again, in general, associated system costs increase in direct relation to increases in required system performance capabilities.

Another factor for consideration with respect to hydraulic devices is their intended use. In general, it may be desirable to avoid unnecessary presence of hydraulic systems in certain work environments. For example, the food industry, which makes widespread use of screw conveyors, is one example of a work environment where certain systems (such as a hydraulic drive) are preferably avoided.

Nonetheless, with reference to the food industry as one particular example, it is often the case that a screw conveyor is involved in a food preparation process or the like for feeding a component to such process. It may be highly desirable in such process, if not in fact a virtual requirement in some instances, that fine adjustments (or even gross setting changes) must be made in the rate of the feeding of the component relative the overall process. For such reasons, the technical problem comes full circle to the long-term problem of providing a screw conveyor with a dependable and acceptable variable speed drive.

Mechanical adjustable variable speed drives of different types have been generally known for some time, but not used in conjunction with a system for driving screw conveyors. The present Assignee provides a full line of mechanical adjustable variable speed belt drives, such as the Reeves-brand "MOTO DRIVE" for example, a handwheel may be used to input changes in the spacing of paired variable speed discs which are coupled by a variable speed drive belt, as well known in the industry, resulting in user-selected mechanical adjustable variable speed. Typically, a fixed speed electric motor is used to power the input, with the output feeding a concentric, in-line gear reducer. The present Assignee also provides an automatic controller known as the "RAC" for electronically controlling the mechanical adjustment for obtaining variable output speeds of the belt drive. See, for example, Woyton (U.S. Pat. No. 4,770,065) which is commonly assigned to the present Assignee. Examples of commonly assigned United States patents which disclose other aspects of some typical prior art mechanical adjustable variable speed belt drives include Huff et al. (U.S. Pat. No. 4,425,102); Meredith (U.S. Pat. No. 4,411,590); Huff et al. (U.S. Pat. No. 4,384,863); and Zigler (U.S. Pat. No. 4,370,139).

The present Assignee also separately markets Dodge-brand "TORQUE-ARM" speed reducers of either straight bore or taper bushing construction. Examples of commonly assigned patents which relate to speed reducers include Strang (U.S. Pat. No. 3,590,652) and Chung (U.S. Pat. No. 3,398,597). Heretofore, such speed reducers have generally not been combined through an interface coupling adapter device or means with a mechanical adjustable variable speed belt drive, nor so combined for use in driving a screw conveyor.

SEW-EURODRIVE, Inc., of Lyman, S.C., has a product which it refers to as the "VARIGEAR"-brand variable speed unit with a "SNUGGLER"-brand reducer. SEW's sales literature refers to both such brand names as being federally registered trademarks. The "VARIGEAR" product comprises a variable speed belt drive which is integrally provided with a reducer such that the shaft about which turns the pair of variable speed output discs of the belt drive comprises the first gear stage of the reducer.

SEW-EURODRIVE, Inc., also similarly incorporates its "SNUGGLER"-brand reducer into its "VARIMOT"-brand variable speed unit, which is a dry traction disc drive, a totally different construction from a mechanical adjustable variable speed belt drive. In the drive industry, the term C-flow means that the motor is on the same side of the drive case as the input shaft, while the term Z-flow means that the motor is on the opposite side. The "VARIMOT" unit with an integral "SNUGGLER" reducer is configured more like a Z-flow drive power arrangement, which requires considerably more mounting space than a C-flow drive power arrangement. The physical layout of the construction also affects the forces at the interface between the load to be driven and the output of the reducer. Such considerations would generally render such a configuration inapplicable to screw conveyor usage, and, in fact, the "VARIMOT" and "VARIGEAR" variable speed units with an integral "SNUGGLER" reducer are not thought to be available originally equipped with a CEMA standard flange mount as would be required for any screw conveyor application.

SUMMARY OF THE INVENTION

The present invention recognizes and addresses various of the foregoing problems, and others, concerning a variable speed drive for a screw conveyor. Thus, broadly speaking, a principal object of this invention is improved screw conveyor drives. More particularly, a main concern is to provide a practical and useful variable speed drive for a screw conveyor. Specifically, it is one main object to achieve a drive arrangement which desirably and effectively combines the advantages and reliability of a mechanical adjustable variable speed belt drive with the efficiency of a torque-arm speed reducer.

It is another present object of this invention to provide a variable speed drive for screw conveyors which negates adverse environment considerations, such as may be involved with certain applications, for example, as in the food industry. A more particular object is an improved variable speed drive for screw conveyors, useful in the food industry and for other similarly environmental sensitive applications.

Another present object is to provide an improved variable speed screw conveyor drive which requires minimum space and which advantageously minimizes undesired forces at the interface between the drive output and the screw conveyor. Still further, it is an object to provide such an improved variable speed screw conveyor drive, the multiple components of which may also be arranged alternatively in various configurations of the user's selection to accommodate practice of the subject invention in particular installations.

It is a still further present object to provide an improved variable speed screw conveyor drive as herein which comprises a multi-component system to provide the advantages available to such a system when servicing the various separable components thereof.

It is also a present object of this invention to provide the capability to retrofit screw conveyor drives presently using a hydraulic drive device, for outfitting the screw conveyor drive with a mechanical adjustable variable speed belt drive and other features in accordance with this invention.

Further in keeping with the foregoing objects, it is a present object of this invention to provide an interface coupling adapter for operatively interconnecting multiple components such as a mechanical adjustable variable speed belt drive and a torque-arm speed reducer, resulting in a variable speed screw conveyor drive in accordance with the invention. It is a further object to provide such an interface coupling adapter which would be equally effective whether used in new or in retrofit installations as described above.

It is a further present object to provide such improved variable speed screw conveyor drives which may have additional protections such as coatings on their exterior surfaces or internal components for safe and reliable use thereof in a variety of potentially hostile work environments.

Additional objects and advantages of the invention are set forth, or will be apparent to those of ordinary skill in the art, from the detailed description which follows. Also, it should be appreciated that modifications and variations to the specifically illustrated and discussed features hereof (including those present through incorporation by reference) may be practiced in various embodiments and uses of this invention without departing from the spirit and scope thereof, by virtue of present reference thereto. Such variations may include, but are not limited to, substitution of equivalent means and features or materials for those shown or discussed, and the functional or positional reversal of various parts or features, or the like.

Still further, it is to be understood that different embodiments, as well as different presently preferred embodiments, of this invention may include various combinations or configurations of presently disclosed features, or their equivalents (including combinations or configurations thereof not expressly shown or stated). One exemplary such embodiment of the present invention relates to a variable speed screw conveyor drive comprising a multi-component system. Such system includes mechanical adjustable variable speed belt drive means, torque-arm speed reducer means, and interface adapter coupling means.

The variable speed belt drive means of the foregoing example preferably has an output shaft, and provides user-selected variable speed powered rotation of such output shaft. The torque-arm speed reducer means has a female input for receipt of a powered shaft, and a screw conveyor flange mount output for drivingly coupling with the drive shaft of a screw conveyor so as to power such screw conveyor. The interface adapter coupling means is preferably for coupling the variable speed drive means to the speed reducer means. So coupled, the variable speed drive means output shaft is preferably received in the speed reducer means female input so that a screw conveyor drive shaft (when coupled with the speed reducer means output) may be powered at user-selected variable speeds.

In such exemplary embodiment, the variable speed drive means output shaft further preferably comprises a male splined member while the speed reducer means female input comprises a female splined member for matably receiving such male splined member. As examples of further preferred, optional features, the system may further include automatic controller means for automatically controlling and adjusting the speed of the output shaft of the mechanical adjustable variable speed belt drive means, which drive means may be configured in a C-flow drive power arrangement. The external or internal surfaces of all such components may include a corrosion resistant coating, for example, such as a protective layer or layers of various polymers. An exemplary acceptable coating approach is described in commonly assigned Nisley et al. (U.S. Pat. No. 4,973,172).

Another present exemplary embodiment concerns an interface coupling adapter for operatively interconnecting a mechanical adjustable variable speed belt drive with a screw conveyor drive having a torque-arm speed reducer input. Such adapter preferably includes at least a first coupling element adapted for securement to the torque-arm speed reducer adjacent to an input thereof and having a bore for passage of a coupling shaft therethrough. The preferred adapter further includes at least a second coupling element adapted for securement to the mechanical adjustable variable speed belt drive adjacent an output thereof and having a bore for passage of a coupling shaft therethrough. Lastly, such adapter further includes means for joining the first and second coupling elements with a coupling shaft received through the respective bores thereof. So coupled, a received coupling shaft would operatively interconnect the variable speed belt drive with the torque-arm speed reducer so that an associated screw conveyor may be driven at user-selected variable speeds. The foregoing exemplary adapter may also be protectively coated in accordance with this invention.

Yet another construction comprising a present exemplary embodiment is directed to a variable speed drive system for powering the drive shaft of a screw conveyor. Such system preferably includes a mechanical adjustable variable speed belt drive, a mounting adapter, a torque-arm speed reducer, a mounting plate, a coupling shaft, and means for joining the mounting plate with the mounting adapter while the coupling shaft is seated for drivingly coupling the variable speed drive with the speed reducer.

More specifically, such an exemplary belt drive may include a drive motor, respective input and output pairs of variable speed discs, a variable speed drive belt coupling such discs, and a straight bore output, all collectively forming a C-flow drive power configuration. The mounting adapter is preferably secured to the variable speed belt drive adjacent the output thereof, and supports a bearing therein for rotatably receiving the coupling shaft, while the mounting plate is secured adjacent an input of the torque-arm speed reducer, and also has a central bore therein for passage of a coupling shaft therethrough.

In the foregoing exemplary construction, the torque-arm speed reducer has a splined female input for receipt of a male splined portion of the coupling shaft, a screw conveyor flange mount for attachment to a screw conveyor, and a straight bore output for drivingly receiving a drive shaft for a screw conveyor when so attached to the screw conveyor flange mount.

The preferred coupling shaft also includes a keyway associated with one axial portion thereof, which during driving receipt of the coupling shaft is drivingly coupled with the output pair of the variable speed drive belt discs. Remaining portions of the shaft are rotatably received in the mounting adapter bearing and through the mounting plate central bore, so that ultimately user-selected variable speed drive power is provided to the screw conveyor drive shaft.

Those of ordinary skill in the art will better appreciate the features and aspects of such embodiments, and others, upon review of the remainder of the specification. Also, the entire disclosures (including specification and drawings) of the above-referenced commonly assigned United States patents are incorporated herein by reference, fully as if presented in their entirety herewith.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures, in which.

Repeat use of reference characters throughout the present specification and appended drawings is intended to represent same or analogous features or elements of the invention.

DETAILED DESCRIPTION OF THE PREFERRED EMBODIMENT

Figure 1:
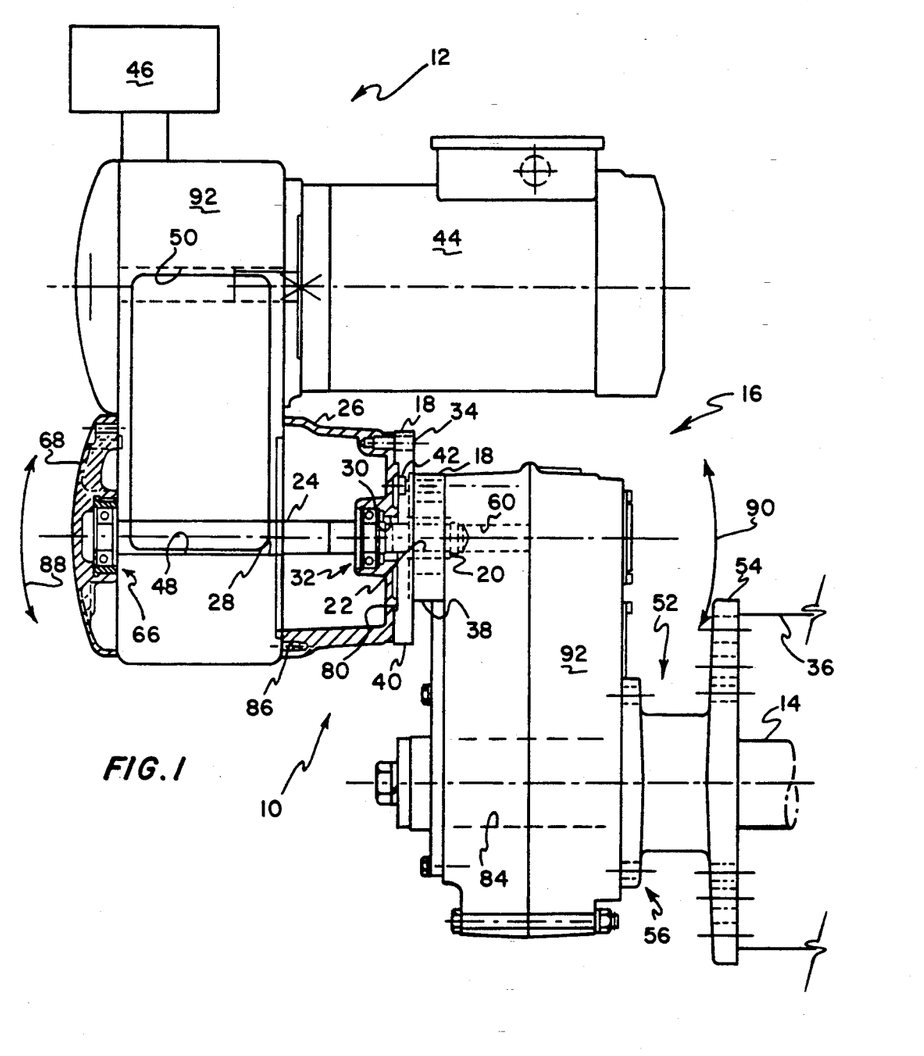
FIG. 1 is a plan view of a design layout of an exemplary embodiment of the present invention, representing all multiple components thereof collectively arranged as a present exemplary variable speed screw conveyor drive.

Those of ordinary skill in the art will understand and appreciate that the following is but one example of an embodiment out of many different embodiments which may be used to practice the subject invention. The plan view of FIG. 1 is a design layout which represents a variable speed screw conveyor drive in accordance with the subject invention. It also represents a present example of an interface coupling adapter or interface adapter coupling means (generally designated by reference character 10) for operatively interconnecting a mechanical adjustable variable speed belt drive means generally 12 with a screw conveyor drive (represented by drive shaft 14) having a torque-arm speed reducer generally 16 as its input. It will be appreciated and understood by those of ordinary skill in the art that cross hatching and dotted line illustration therein is indicative of sectional and obstructed (i.e. hidden) subject matter, respectively.

In such an interface coupling adapter, at least a first coupling element 18 is adapted for securement to the torque-arm speed reducer 16 adjacent to an input 20 thereof. First coupling element 18 also has a bore 22 for passage of a coupling shaft 24 therethrough. Additional details of such coupling shaft are discussed below with reference to present FIGS. 2 and 3.

Interface coupling adapter 10 further includes at least a second coupling element 26 which is adapted for securement to the mechanical adjustable variable speed belt drive means 12 adjacent an output 28 thereof. Such second coupling element 26 also includes a bore 30 for the passage of coupling shaft 24 therethrough, and preferably further includes a bearing 32 for rotatably receiving and supporting coupling shaft 24 therethrough. Additional details of such a bearing, well known to those of ordinary skill in the art, are not required for an enabling understanding of the subject invention. Second coupling element 26 is itself generally similar in construction and function to a so-called short C-face adapter used by the present Assignee in a C-face output of its Reeves-brand "MOTO DRIVE" mechanical adjustable variable speed belt drive referenced above.

Interface coupling adapter 10 also includes means 34 for joining first coupling element 18 with second coupling element 26, with a coupling shaft 24 preferably received through respective bores 22 and 30. With such an arrangement, shaft 24 operatively interconnects the variable speed belt drive 12 with the torque-arm speed reducer 16 so that drive shaft 14 of an associated screw conveyor may be driven at user-selected variable speeds. Such an associated screw conveyor (generally well known of those of ordinary skill in the art) is further represented by the partial representation of a trough 36 thereof. Such means 34 for joining may comprise bolts or the like which are operatively associated with aligned bolt holes in the respective coupling elements 18 and 26, discussed further below with reference to FIGS. 4 and 5.

First coupling element 18 may comprise a single, integral element. In the exemplary embodiment of present FIG. 1, first coupling element 18 is in fact illustrated as comprising two separable elements including a first plate 38 comprising a hydraulic motor adapter and a second plate 40 comprising a substantially flat annular element. Collectively such first and second plates 38 and 40 may be thought as comprising a coupling or mounting plate as compared with the relatively larger element 26 which may be referenced also as a coupling member or mounting adapter.

Substantially flat annular element 40 preferably has a larger outside diameter than that of hydraulic motor adapter 38. The further radially extending portions of second plate 40 relative first plate 38 receive the means 34 for joining for securement of second plate 40 with coupling member 26. As illustrated, first plate 38 and second plate 40 are mutually secured to torque-arm speed reducer 16 such as by threaded bolt 42. Plural bolts 42 may also be practiced. In such context, the combination of members 38 and 40 (which may also comprise a single element 18) may be referenced as being a first coupling element with respect to element 26 which in such context may be regarded as a second coupling element. First plate 38 is proximate or directly received against the speed reducer 16, and in the alternative may comprise a hydraulic motor adapter for receipt of a hydraulic device therewith for powering speed reducer 16, as referenced above in the background section of this application.

Additional details of plate 40 are discussed below with reference to present FIGS. 4 and 5, while additional details of such hydraulic motor adapter 38 are discussed below with reference to present FIGS. 6 and 7.

Though not illustrated in detail, it will be appreciated by those of ordinary skill in the art that the mechanical adjustable variable speed belt drive means 12 generally includes a drive motor 44 for operating preferably at a constant speed such as 1750 rpm. Drive 12 further includes respective input and output pairs of variable speed discs on rotating shafts and a variable speed belt drive coupling such discs, none of which details are specifically illustrated in present FIG. 1, though well known to those of ordinary skill in the art. Specific recitation of such details here are not necessary for a complete understanding of the present invention, but may be better understood by consideration of the commonly assigned patents incorporated above by reference into the present disclosure, and including Woyton, Huff et al. (two patents), Meredith, and Zigler.

It will be further understood that such variable speed belt drive 12 may in some instances be provided with a handcrank or equivalent, whereby the user selects the desired variable speed output. In some other instances an automatic controller means may be associated with drive 12 for automatically controlling and adjusting the speed of the drive means output shaft responsive to a user-selected speed setting. An example of such automatic controller means is disclosed in Woyton (U.S. Pat. No. 4,770,065). Both the handcrank arrangement and such automatic controller means are graphically represented in present FIG. 1 by the structure associated with reference character 46.

In a particular exemplary embodiment of present FIG. 1, drive means 12 includes a straight bore output 48 with which output shaft 24 is associated. The overall configuration of drive means 12 is referred to as a C-flow drive power arrangement. The plane mutually defined by an input shaft 50 of drive means 12 and straight bore output 48 thereof is represented as residing parallel with the plane in which the trough 36 of the associated, powered screw conveyor resides. In any of its various possible present constructions, the C-flow drive power configuration reduces the amount of space required by the present variable speed screw conveyor drive, and minimizes undesirable forces at the interface between trough 36 and the screw conveyor flange mount output 52 of torque-arm speed reducer means 16. Such CEMA standard flange mount output includes flange 54 which directly receives trough 36 or the like of the screw conveyor, and includes the drive coupling between drive shaft 14 and the output 56 of speed reducer 16.

Figure 2:
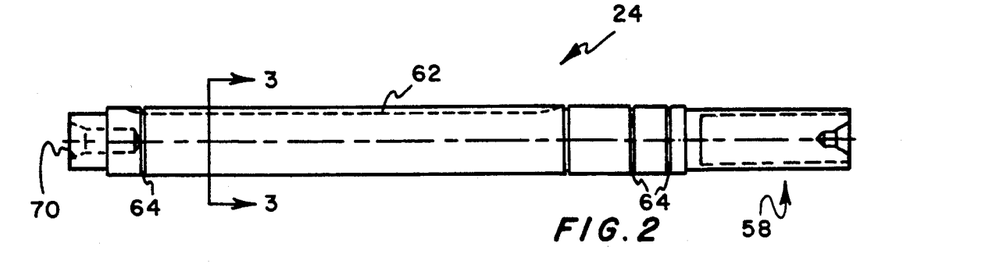
FIG. 2 is an enlarged side view of an exemplary embodiment of a present coupling shaft for use with the present invention.
Figure 3:
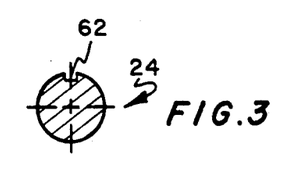
FIG. 3 is a cross section of the exemplary coupling shaft of present FIG. 2, taken along section line 3—3 as indicated in such figure.

With reference also to present FIG. 2, coupling shaft 24 includes a male splined configuration axial portion 58 which is particularly adapted for being received in a female splined input (generally 60) of speed reducer 16. Torque is transmitted to such male splined output 58 through a keyway 62 formed in an axial portion of shaft 24 which is operatively associated with the output discs of variable speed belt drive means 12. Present FIG. 3 illustrates in sectional view such axial portion of shaft 24 including keyway 62. While a splined interface between shaft 24 and speed reducer 16 is preferred, such preference does not preclude application of the broader aspects of this invention to other arrangements, such as for example a so-called direct coupling.

Additional features of coupling shaft 24 will be apparent to those of ordinary skill in the art from the present illustration in FIG. 2 considered in conjunction with illustration of present FIG. 1. For example, snap rings (not illustrated) may be received in snap ring grooves 64 for holding shaft 24 in proper alignment adjacent bearings 32 and 66 (see FIG. 1). Bearing 66 is received and supported in a variable bearing plate or cover 68 which may be alternately removed and placed on a side of the belt case of variable speed belt drive 12. In particular, as will be appreciated by those of ordinary skill in the art, removal of cover 68 facilitates introduction of the special coupling shaft 24 into the straight bore output 48 of belt drive means 12, and into proper relation with the respective bores 22 and 30 of coupling members 18 and 26, and ultimately for proper seating of male splined end 58 in female splined input 60 of speed reducer 16. Additional features of the coupling shaft of present FIG. 2, such as the tachometer pickup 70 thereof, are not discussed in detail herewith, and are not pertinent to a complete understanding of the present invention.

Figure 4:
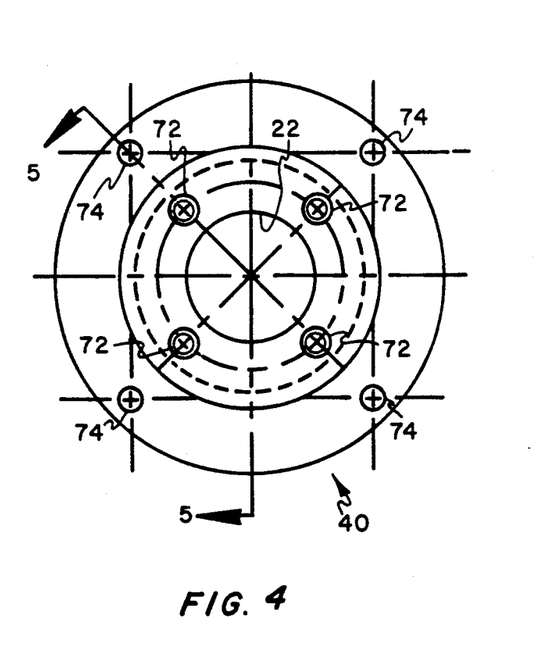
FIG. 4 is an enlarged end view of an example of one of the components comprising interface coupling adapter features of the subject invention.
Figure 5:
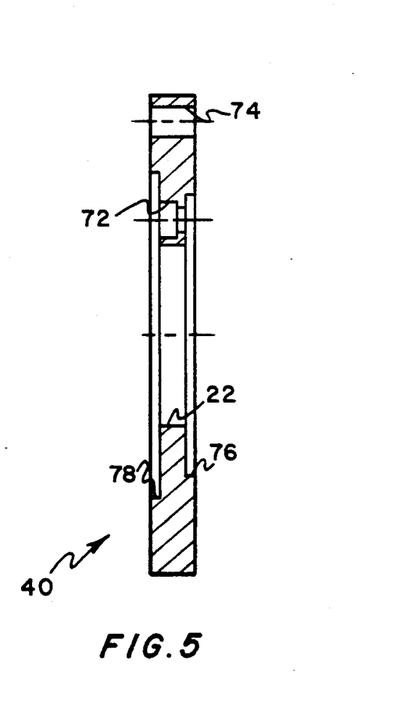
FIG. 5 is a cross section of the exemplary interface coupling component of present FIG. 4 taken along section line 5—5 as indicated in such figure.

With reference to present FIGS. 4 and 5, an end view of the second coupling plate or substantially flat annular plate 40 (FIG. 4) represents a plurality of bolt holes or the like therein. Specifically, at least two, and preferably four bolt holes 72 are formed a given distance regularly outward from central bore 22 thereof. Such bolt holes 72 are aligned with like-position bolt holes in first plate or hydraulic motor adapter 38, so that receipt of a threaded bolt or its equivalent through such aligned holes results in mutual securement of members 38 and 40 to speed reducer 16 adjacent input 60 thereof (as illustrated in present FIG. 1).

As represented in present FIG. 4, at least two additional bolt holes or the like 74 (and preferably four such holes) appear radially further outward in equal distance from the central bore for operative association with the means for joining (bolting means or their equivalents) so that element 40 may be secured to element 26 (see FIG. 1). Present FIG. 4 also represents the fact that such further bolt holes 74 appear in portions of member 40 which are radially outward from the outside diameter of member 38, so as to accommodate the above-mentioned operative association with second coupling element or mounting adapter 26.

Present FIG. 5 illustrates a cross-sectional view of element 40, taken along the section line 5—5 of present FIG. 4. Such cross section represents the relationship of an exemplary bolt hole 72 with that of exemplary bolt hole 74. Also represented is a shoulder 76 which forms a stop for receipt of the outside diameter of member 38 thereagainst. Similarly, on the opposite axial side of member 40, a shoulder 78 is provided for placement of a mating extended portion 80 of second coupling element or mounting adapter 26 (as illustrated in present FIG. 1).

Figure 6:
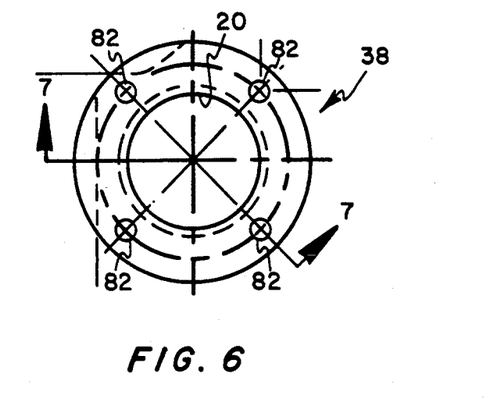
FIG. 6 is an enlarged end view of another exemplary component of the present interface coupling adapter features, which may alternatively serve as a hydraulic motor adapter.
Figure 7:
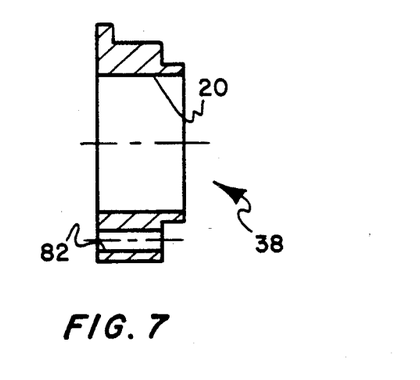
FIG. 7 is a cross section of the exemplary component of present FIG. 6 taken along section line 7—7 as indicated in such figure.

Present FIGS. 6 and 7 illustrate in plan and sectional views, respectively, such first plate or hydraulic motor adapter 38 as discussed. Bolt holes 82 of such member 38 preferably appear in such number and spacing so as to be able to be aligned with bolt holes 72 of second plate 40 for their mutual securement to speed reducer 16.

While various constructions may be provided, members 26, 38, and 40 collectively comprise interface coupling adapter or interface adapter coupling means 12 in accordance with this invention. They may all be formed from cast iron or its equivalents. Also, it will be understood that an integral part 18 may be formed from a combination of elements 38 and 40. Separable provision of members 38 and 40 permits member 38 to be utilized as a hydraulic motor adapter in conjunction with receipt of a hydraulic device seated on the input of speed reducer 16. If such a member 38 is present at the start of retrofitting a hydraulic drive system, it can continue to be used by the addition of element 40, or by removing the existing hydraulic motor adapter and replacing it with a member such as 18 (38 and 40 combined).

Such speed reducer 16 may comprise various constructions, such as represented by the exemplary patents incorporated by reference above. Preferably the speed reducer 16 has a substantially straight bore 84 associated with its output 56, which is a CEMA standard for accepting the drive shaft 14 of a screw conveyor.

It should also be further understood that a plurality of bolt holes should be present in member 26 in both number and placement thereof for selected alignment with respective bolt holes 74 of member 40 (only one of which exemplary alignments is represent in present FIG. 1). Similarly, a plurality of bolt holes should be received on the opposite axial side of member 26 (towards belt drive means 12) for the mounting of member 26 to such drive means 12. Again, for clarity in illustration, only a single such bolt hole 86 is represented in present FIG. 1, though a plurality of such bolt holes (such as four or six) may be variously provided around the periphery of member 16 which interfaces with the belt case of belt drive means 12. Those of ordinary skill in the art will also understand that bolts or their equivalents as received in such bolt holes 86 would be best driven from inside the belt case of belt drive means 12, such as when cover 68 or other elements thereof are removed.

In addition to the foregoing, double-headed arrows 88 and 90 (FIG. 1) represent additional variation which may be practiced in accordance with this invention concerning the configuration of the components of the variable speed screw conveyor drive system. As mentioned above, the plane mutually defined by input 50 and output 48 of belt drive means 12 lies in a plane parallel with that of the screw conveyor associated with trough 36 and drive shaft 14 (i.e., parallel with the paper). While different rotations may be practiced, the four bolt holes 74 of element 40 (FIG. 4) may be used to vary the interface between members 26 and 40 at 90° increments. Double-headed arrow 88 represents such different configurations, which would result alternately in a plane mutually defined by members 48 and 50 which is either simply not parallel with the plane in which the associated, powered screw conveyor resides, or which is perpendicular to such plane.

Similarly, double-headed arrow 90 represents variations which may be practiced by rotating the interfacing between flange 54 and trough 36, or between flange 54 and the output 56 of speed reducer 16, or between the input to speed reducer 16 and member 38, or even by varying the relative relationship between members 38 and 40. Again, such variations result in relative changes between a plane associated with the powered screw conveyor and a plane mutually defined by members 60 and 84 of speed reducer 16, which relationships include parallel, not parallel, and perpendicular positions to one another. Variations in such configurations may be made in accordance with this invention either at the discretion of the user of this invention or as warranted by circumstances of a given application of the present variable speed screw conveyor drive system.

Two presently preferred configurations include the parallel plane construction represented in its entirety by present FIG. 1, and a configuration wherein the mutual plane defined by members 48 and 50 of belt drive means 12 is parallel with the plane mutually defined by members 60 and 84 of speed reducer 16, but perpendicular to the plane in which the associated, powered screw conveyor resides, with electric motor 44 in a generally raised or upright position above trough 36. Other positions may be practiced in accordance with this invention. In any such configurations, additional bracing, support or the like, may be provided if needed beyond that arising from use of the present interface adapter coupling means 10. However, in many applications, the support provided by such interface adapter coupling means 10 will be itself adequate.

Those of ordinary skill in the art will appreciate that mounting brackets of various configurations may be integrally provided with speed reducer 16. For example, in the configuration of present FIG. 1, such mounting brackets would be on the underside of such speed reducer 16, and accordingly are not visible in the present exemplary illustration. Specific details of such mounting brackets form no specific part of the subject invention, and hence additional details thereof are not required for an adequate understanding of this invention.

Any of the various exterior surfaces 92 of the present components may be provided with a protective coating, such as in accordance with commonly assigned U.S. Pat. No. 4,973,172 (Nisley et al.), the complete disclosure of which is incorporated herein by reference. As discussed in such patent, such coating may comprise one or more coats of a polymer such as a fluorocarbon polymer, providing environmental protection in hostile environments such as involving corrosive or chemical attach.

By way of further example, a belt case or the like may be provided with a corrosion resistant material coating, preferably a fluorocarbon polymer which is impervious to oxidation, chemical attack and the like. In one preferred arrangement, two different coatings of fluorocarbon polymers may be applied in particular thickness ranges. The coating thicknesses are devised in accordance with acceptable tolerances associated with each of the details of the coated components in order to avoid any binding in the movement of the parts and the prevention of inadvertent wear of the material from the parts while also affording the desired protection in harsh environments.

In one preferred embodiment, the exterior surfaces of the components are coated with a polymeric material which not only will resist corrosion and chemical attack, but which also has adequate resilience and/or toughness to withstand blows from hammers, wrenches and other foreign objects and which will not chip off the structure. Polyamides such as nylon are most preferred for coating of the outer housings though epoxies and fluorocarbons may also be applied thereto. Other elements which are normally received within the housings and/or otherwise located where damage from foreign objects is not likely are preferably covered with fluorocarbon coatings. Practically speaking, the polytetrafluoroethylenes are most often employed and, when in direct contact with the metal, include a thermoset binder component such as a phenolic for proper adherence to the prepared metal surface. Further, a top coating of polytetrafluoroethylene polymer composition may then be applied atop the base coating for crosslinking therewith.

By way of more specific example, a belt case and outer coverings of a variable speed belt drive 12 may be arranged to be corrosion resistant and impervious to most environment, in particular, with respect to extremely corrosive environments, such as salt water, fertilizers, concrete, sewage disposal and chemical processes, for preventing premature rusting and deterioration of the internal parts as well as the external parts. In accomplishing this goal, the exterior surface 92 of drive means 12 is coated with a protective coating such as epoxy coatings, or polyamides exemplified by nylon, the latter being preferred due to its unique characteristic of being most durable of the known materials for this purpose. The coating of the nylon has a thickness approximately 0.008" to 0.020". Any exposed portions of shaft 24 may be coated with a base coat of a polytetrafluoroethylene polymer having a thermoset binding material, such as a phenolic binder included therein for adherence to these parts, the coating having a thickness of 0.0004" to 0.0006" and being applied to any exposed parts of the shaft and extending into the belt case of drive means 12 under any adjacent input seals. Such a coating thus effectively covers all exposed portions of the shaft (or any other exposed component when so treated). Generally, any stainless steel components may also be made of steel coated with a base coating of a polytetrafluoroethylene with a binding material.

Any bushings, including their tapered surfaces, the interior surface of bores, and any flanges may also be base coated with a base coating of a fluorocarbon polymer such as a polytetrafluoroethylene polymer having a thermoset binding material included therein. Similarly, the torque-arm speed reducer means 16 and the interface coupling adapter 10 may have applied thereto a base coating of the polymer with binding material. A coating of a nylon is applied to the adapter components to a suitable thickness for example of about 0.008" to 0.020".

While other fluorocarbon polymers may be employed in accordance with such coating features of the present invention, a preferred base polymer is a polytetrafluoroethylene with a phenolic binder, such as Teflon S, a fluorocarbon coating material produced by E. I. duPont, Wilmington, Del., which is quite suitable and may be applied to the prepared metal surface by spraying or the like. Preparation of the metal part exterior surfaces includes cleaning of the part to remove oils, greases, and the like, roughening of the part by grit blasting or the like and preheating of the part of a suitable metal temperature, e.g., about 400° F. to about 425° F. Top coatings may thereafter be suitably applied as by electrostatic spray techniques followed by heating at temperatures of about 725° F. for about 20 minutes, or the like.

Products coated according to the present invention thus not only resist corrosion and other deterioration in harsh environs, but also have been found to facilitate cleaning such as by high pressure washes and facilitate better seating of the interrelated elements, while at the same time facilitating ease of removal for repair, replacement, and the like.

Through practice of the foregoing invention, a highly dependable and practical variable speed drive is provided for a screw conveyor. Such drive system has the advantage of being also retrofittable to certain installations already having a hydraulic device mounted through a specific hydraulic motor adapter to a torque-arm speed reducer outfitted with a CEMA standard screw conveyor output. It should be further understood by those of ordinary skill in the art that the foregoing presently preferred embodiment is exemplary only, and that the attendant description thereof is likewise by way of words of example rather than words of limitation, and their use does not preclude inclusion of such modifications, variations, and/or additions to the present invention which would be readily apparent to one of ordinary skill in the art, the scope of the present invention being set forth in the following appended claims.

What is claimed is:

1. A variable speed screw conveyor drive, comprising a multi-component system, including:

mechanical adjustable variable speed belt drive means, having an output shaft, for providing user-selected variable speed powered rotation of said output shaft;

torque-arm speed reducer means, having a female input for receipt of a powered shaft, and a screw conveyor flange mount output for drivingly coupling with the drive shaft of a screw conveyor so as to power such screw conveyor; and interface adapter coupling means for coupling said variable speed drive means to said speed reducer means with said variable speed drive means output shaft passing through said coupling means and received in said speed reducer means female input, so that a screw conveyor drive shaft when coupled with said speed reducer means output may be powered at user-selected variable speeds.

2. A variable speed screw conveyor drive as in claim 1, wherein said variable speed drive means output shaft comprises a male splined member, and said speed reducer means female input comprises a female splined member for matably receiving said male splined member.

3. A variable speed screw conveyor drive as in claim 1, wherein said speed reducer means output includes a straight bore adapted for receipt of a screw conveyor drive shaft, and wherein said interface adapter coupling means is further operative for providing at least partial support of said variable speed drive means.

4. A variable speed screw conveyor drive as in claim 1, wherein said interface adapter coupling means includes bearing means for rotatably supporting said variable speed drive means output shaft.

5. A variable speed screw conveyor drive as in claim 1, wherein said system further includes automatic controller means associated with said mechanical adjustable variable speed belt drive means for automatically controlling and adjusting the speed of said drive means output shaft responsive to a user-selected speed setting.

6. A variable speed screw conveyor drive as in claim 1, wherein said variable speed belt drive means includes two pairs of variable speed discs with a variable speed drive belt operatively coupled therebetween, and wherein said drive means is configured in a C-flow drive power arrangement with respective shafts of said disc pairs mutually defining a plane in which said C-flow drive power arrangement resides.

7. A variable speed screw conveyor drive as in claim 6, wherein said plane in which said variable speed drive means C-flow drive power arrangement resides is parallel with a plane in which a trough of an associated, powered screw conveyor resides.

8. A variable speed screw conveyor drive as in claim 6, wherein said plane in which said variable speed drive means C-flow drive power arrangement resides is not parallel with a plane in which a trough of an associated, powered screw conveyor resides.

9. A variable speed screw conveyor drive as in claim 8, wherein said plane in which said variable speed drive means C-flow drive power arrangement resides is perpendicular to a plane in which a trough of an associated, powered screw conveyor resides.

10. A variable speed screw conveyor drive as in claim 6, wherein said speed reducer means input and outout mutually reside in a common plane which is parallel with said plane in which said variable speed drive means C-flow drive power arrangement resides.

11. A variable speed screw conveyor drive as in claim 6, wherein said speed reducer means input and output mutually reside in a common plane which is not parallel with said plane in which said variable speed drive means C-flow drive power arrangement resides.

12. A variable speed screw conveyor drive as in claim 11, wherein said speed reducer means input and output mutually reside in a common plane which is perpendicular with said plane in which said variable speed drive means C-flow drive power arrangement resides.

13. A variable speed screw conveyor drive as in claim 1, wherein surfaces of said components include a protective coating.

14. A variable speed screw conveyor drive as in claim 1, wherein said mechanical adjustable variable speed belt drive means has an output bore into which said output shaft is received in drive coupled relationship and extending therefrom.

15. A variable speed screw conveyor drive, comprising a multi-component system, including:
- mechanical adjustable variable speed belt drive means, having an output shaft, for providing user-selected variable speed powered rotation of said output shaft;
- torque-arm speed reducer means, having a female input for receipt of a powered shaft, and a screw conveyor flange mount output for drivingly coupling with the drive shaft of a screw conveyor so as to power such screw conveyor; and
- interface adapter coupling means for coupling said variable speed drive means to said speed reducer means with said variable speed drive means output shaft received in said speed reducer means female input, so that a screw conveyor drive shaft when coupled with said speed reducer means output may be powered at user-selected variable speeds;
- wherein said interface adapter coupling means includes at least one coupling plate attached to said speed reducer means about said female input thereof, and at least one coupling member adapted for attachment to said variable speed drive means and to said coupling plate, and said coupling member carrying bearing means thereon for rotatably supporting said output shaft.

16. A variable speed screw conveyor drive as in claim 15, wherein said at least one coupling plate includes a first plate directly secured against said speed reducer means, and a second plate of larger outside diameter than said first plate and secured thereagainst, said second plate having bolt holes formed in areas thereof which reside radially beyond said first plate for receipt therein of bolting means for securing said second plate to said coupling member.

17. An interface coupling adapter for operatively interconnecting a mechanical adjustable variable speed belt drive with a screw conveyor drive having a torque-arm speed reducer input, said adapter including at least a first coupling element adapted for securement to the torque-arm speed reducer adjacent to an input thereof and having a bore for passage of a coupling shaft therethrough, and at least a second coupling element adapted for securement to the mechanical adjustable variable speed belt drive adjacent an output thereof and having a bore for passage of a coupling shaft therethrough, and said adapter further including means for joining said first and second coupling elements with a coupling shaft received through the respective bores thereof for operatively interconnecting the variable speed belt drive with the torque-arm speed reducer, so that an associated screw conveyor may be driven at user-selected speeds.

18. An interface coupling adapter as in claim 17, wherein said first and second coupling elements each include a plurality of bolt holes in respective alignment from one coupling element to another, and wherein said means for joining includes bolts adapted for operative association with said aligned bolt holes.

19. An interface coupling adapter as in claim 17, wherein said second coupling element includes a bearing for rotatably receiving and supporting a coupling shaft therethrough.

20. An interface coupling adapter as in claim 17, further including a coupling shaft received in the respective bores of said first and second coupling elements, and having a keyway axial portion for operative association with a mechanical adjustable variable speed belt drive and having a splined male output for operative association with a splined female input of a torque-arm speed reducer.

21. An interface coupling adapter as in claim 17, wherein said first coupling element comprises two separable members including a hydraulic motor adapter and a substantially flat annular element having a larger outside diameter than that of said hydraulic motor adapter, with said hydraulic motor adapter and said substantially flat annular element being mutually securable to a torque-arm speed reducer input such that said hydraulic motor adapter is proximate to such speed reducer and said substantially flat annular element is on an opposite side of said hydraulic motor adapter for securement thereof to said second coupling element with said means for joining extending through portions of said substantially flat annular element which extend radially beyond the outside diameter of said hydraulic motor adapter.

22. An interface coupling adapter as in claim 17, wherein surfaces of said adapter include a protective coating.

23. A variable speed drive system for powering the drive shaft of a screw conveyor, said system comprising:
- a mechanical adjustable variable speed belt drive, having a drive motor, respective input and output pairs of variable speed discs, a variable speed drive belt coupling said discs, and a straight bore output, collectively forming a C-flow drive power configuration;
- a mounting adapter secured to said variable speed belt drive adjacent said output thereof, and supporting a bearing therein for rotatably receiving a coupling shaft therein;
- a torque-arm speed reducer having a splined female input, a screw conveyor flange mount for attachment to a screw conveyor, and a straight bore output for drivingly receiving a drive shaft for a screw conveyor when attached to said screw conveyor flange mount;
- a mounting plate secured to said torque-arm speed reducer adjacent said input thereof, and having a central bore therein for passage of a coupling shaft therethrough;
- a coupling shaft, having a keyway associated with one axial portion thereof and a male spline configuration associated with another axial portion thereof; and
- means for joining said mounting plate with said mounting adapter while said coupling shaft is seated such that said shaft keyway is drivingly coupled with said output pair of said variable speed drive belt discs, said shaft male spline configuration is drivingly coupled with said speed reducer splined female input, and said shaft is rotatably received in said mounting adapter bearing and through said mounting plate central bore.

24. A variable speed drive system as in claim 23, wherein surfaces of said system further include a protective coating.

25. A variable speed drive system as in claim 23, wherein said C-flow drive power configuration resides in a plane which is parallel with that of the trough of the screw conveyor with which said drive system is used.

26. A variable speed drive system as in claim 23, wherein said C-flow drive power configuration resides in a plane which is perpendicular with that of the trough of the screw conveyor with which said drive system is used.

27. A variable speed drive system as in claim 23, wherein said mounting plate is comprised of two separable elements, including a hydraulic motor adapter for securement directly against said torque-arm speed reducer, and a substantially flat annular plate having at least one bolt hole for mutual securement of said annular plate and said hydraulic motor adapter to said torque-arm speed reducer, and having at least one bolt hole for operative association with said means for joining.

28. A variable speed drive system as in claim 27, wherein said substantially flat annular plate includes a central bore, at least two bolt holes radially outward an equal distance from said central bore for said mutual securement of said annular plate and said hydraulic motor adapter to said torque-arm speed reducer, and at least two additional bolt holes radially outward a further, equal distance from said central bore for said operative association with said means for joining.

* * * * *